United States Patent
Collins et al.

(10) Patent No.: US 9,361,520 B2
(45) Date of Patent: Jun. 7, 2016

(54) METHOD AND SYSTEM FOR TRACKING OBJECTS

(71) Applicant: Disney Enterprises, Inc., Burbank, CA (US)

(72) Inventors: Robert T. Collins, State College, PA (US); George Peter Carr, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 145 days.

(21) Appl. No.: 14/250,207

(22) Filed: Apr. 10, 2014

(65) Prior Publication Data
US 2015/0294158 A1 Oct. 15, 2015

(51) Int. Cl.
*G06K 9/00* (2006.01)
*G06K 9/52* (2006.01)
*G06K 9/46* (2006.01)
*H04N 7/00* (2011.01)

(52) U.S. Cl.
CPC .............. *G06K 9/00711* (2013.01); *G06K 9/46* (2013.01); *G06K 9/52* (2013.01); *G06K 2009/4666* (2013.01)

(58) Field of Classification Search
USPC ......... 382/100, 103, 106–107, 123, 151, 162, 382/168, 173, 181, 193–194, 199, 203, 209, 382/214, 219, 232, 254, 274, 276, 285–291, 382/305, 312; 700/264; 348/148, 116; 345/473
See application file for complete search history.

(56) References Cited

U.S. PATENT DOCUMENTS

| | | | | |
|---|---|---|---|---|
| 2004/0095352 | A1* | 5/2004 | Huang | G06T 13/40 345/473 |
| 2011/0231016 | A1* | 9/2011 | Goulding | G06N 3/008 700/246 |
| 2014/0226855 | A1* | 8/2014 | Savvides | G06K 9/00771 382/103 |
| 2015/0077559 | A1* | 3/2015 | Wu | H04N 5/23267 348/148 |

OTHER PUBLICATIONS

Weina Ge and Robert T. Collins, "Marked Point Processes for Crowd Counting", CVPR, 2009, pp. 1-8.*
Wonsik Kim, "Markov Chain Monte Carlo Combined with Deterministic Methods for Markov Random Field Optimization", CVPR 2009, pp. 1-8.
Chang Huang, "Robust Object Tacking by Hierarchical Association of Detection Response", ECCV 2008, pp. 1-14.
Li Zhang, "Global Data Association for Multi-Object Tracking Using Network Flows", IEEE 2008, pp. 1-8.

(Continued)

*Primary Examiner* — Seyed Azarian
(74) *Attorney, Agent, or Firm* — Farjami & Farjami LLP

(57) ABSTRACT

There is provided a system for tracking objects. The system includes a processor and a memory for storing a plurality of sensory data frames. The processor determines a first hypothesized location for each of the objects in each of the plurality of sensory data frames. For each of the plurality of sensory data frames, the processor determines probabilities that the first hypothesized location of each of the objects in a sensory data frame of the plurality of sensory data frames is the same as the first hypothesized location of another object in an adjacent sensory data frame. The processor computes a first optimal trajectory for each of the objects using an algorithm based on the probabilities, checks the first optimal trajectory for each of the objects, and accepts or rejects the first optimal trajectory for each of the objects.

16 Claims, 5 Drawing Sheets

(56) References Cited

OTHER PUBLICATIONS

Jerome Berclaz, "Multiple Object Tracking using K-Shortest Paths Optimization", Feb. 4, 2011, pp. 1-16.
William Brendel, "Multiobject Tracking as MaximumWeight Independent Set", CVPR, 2011, pp. 1-8.
Hamed Pirsiavash, "Globally-Optimal Greedy Algorithms for Tracking a Variable Number of Objects", CVPR, 2011, pp. 1-8.
Anton Andriyenko, "Discrete-Continuous Optimization for Multi-Target Tracking", CVPR, 2012, pp. 1-8.
Michael D. Breitenstein, "Online Multiperson Tracking-by-Detection from a Single, Uncalibrated Camera", Sep. 2011, pp. 1820-1833 (14).
Tao Zhao, "Bayesian Human Segmentation in Crowded Situations", CVPR, 2003, pp. 1-8.
M.N.M. van Lieshout, "Depth Map Calculation for a Variable Number of Moving Objects Using Markov Sequential Object Processes", Jul. 2008, pp. 1308-1312 (5).
Ernesto Brau, "A Generative Statistical Model for Tracking Multiple Smooth Trajectories", CVPR, 2011, pp. 1-8.
Weina Ge, "Multi-target Data Association by Tracklets with Unsupervised Parameter", Estimation, 2008, pp. 1-10.
Songhwai Oh, "Markov Chain Monte Carlo Data Association for Multi-Target Tracking", Mar. 2009, pp. 481-497 (17).
Ben Benfold, "Stable Multi-Target Tracking in Real-Time Surveillance Video (Preprint)" Jun. 2011, pp. 1-8.
Zia Khan, "MCMC Data Association and Sparse Factorization Updating for Real Time Multitarget Tracking with Merged and Multiple Measurements", Dec. 2006, pp. 1960-1972 (13).
Peter Carr, "Monocular Object Detection Using 3D Geometric Primitives", ECCV, 2012, pp. 1-14.
Robert T. Collins, "Multitarget Data Association with Higher-Order Motion Models", CVPR, 2012, p. 1-8.
Khurram Shafique, "A Non-Iterative Greedy Algorithm for Multi-frame Point Correspondence", Jan. 2005, pp. 1-6.
Peter J. Green, "Reversible jump Markov chain Monte Carlo computation and Bayesian model determination", 1995, pp. 711-732 (22).
Alexandre Alahi, "Sparsity Driven People Localization with a Heterogeneous Network of Cameras", 2011, pp. 1-20.
Horesh Ben Sitrit, "Multi-Commodity Network Flow for Tracking Multiple People", Sep. 2013, pp. 1-14.
Horst Possegger, "Robust Real-Time Tracking of Multiple Objects by Volumetric Mass Densities", CVPR2013, pp. 1-8.
Keni Bernardin, "EvaluatingMultiple Object Tracking Performance: The Clear MOT Metrics", 2008, pp. 1-10.
Francois Fleuret, "Multicamera People Tracking with a Probabilistic Occupancy Map", Feb. 2008, pp. 267-282 (16).

* cited by examiner

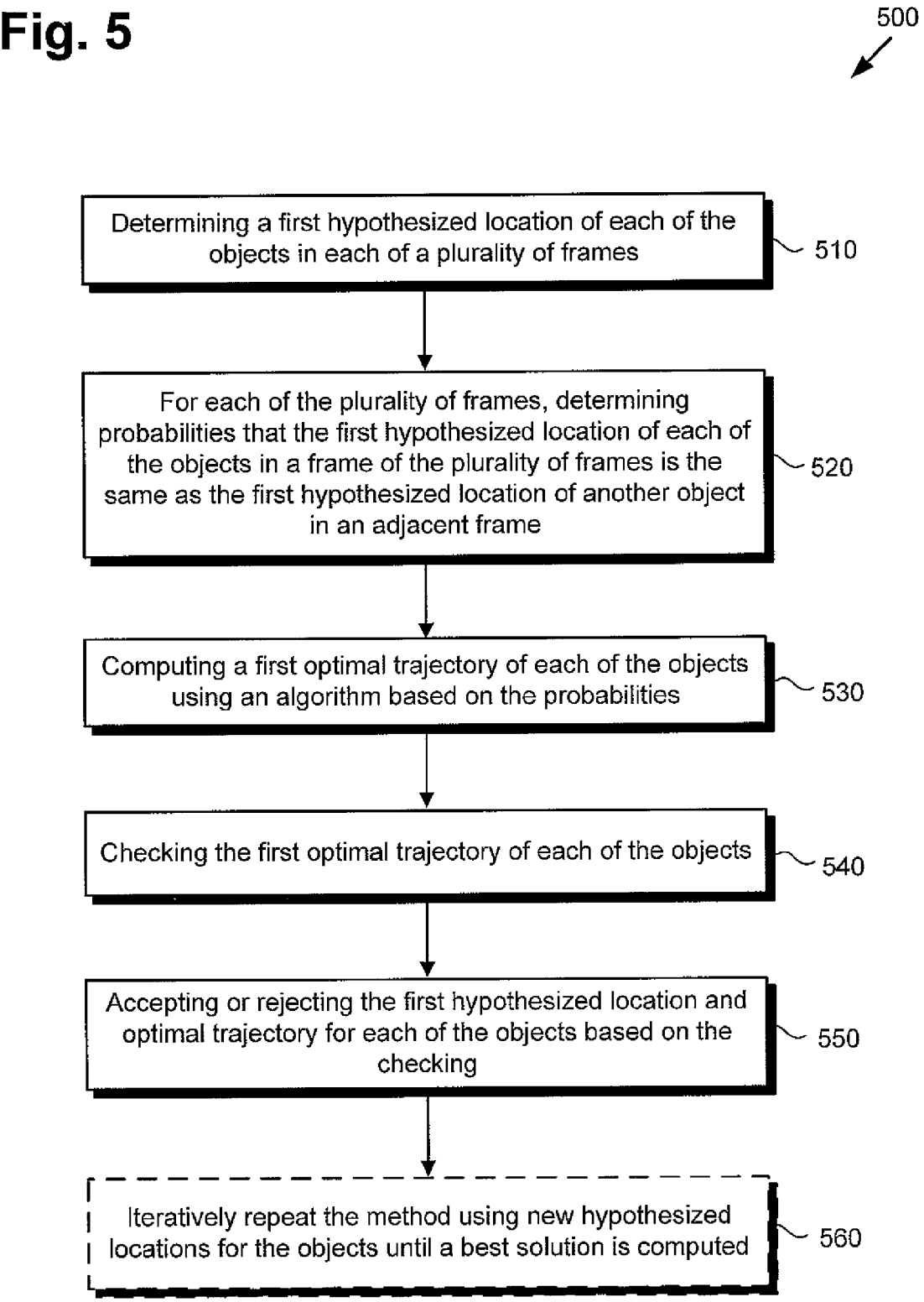

METHOD AND SYSTEM FOR TRACKING OBJECTS

BACKGROUND

Tracking an object in a video includes detecting the object in the video and then tracking the trajectory that the object makes throughout the entire video. The detection and trajectory can be used to show where the object was moving and what the object was doing. However, multitarget tracking of pedestrians and sports players in a video is a difficult problem due to the presence of many similar-looking objects interacting in close proximity with each other. The resulting clutter and occlusions lead to frequent missed/false detections and incorrect associations of the pedestrians and sports players.

SUMMARY

The present disclosure is directed to methods and systems for tracking objects, substantially as shown in and/or described in connection with at least one of the figures, as set forth more completely in the claims.

BRIEF DESCRIPTION OF THE DRAWINGS

FIG. 5 shows a flowchart illustrating a method of tracking objects in a video, according to one implementation of the present disclosure.

DETAILED DESCRIPTION

Figure 1:
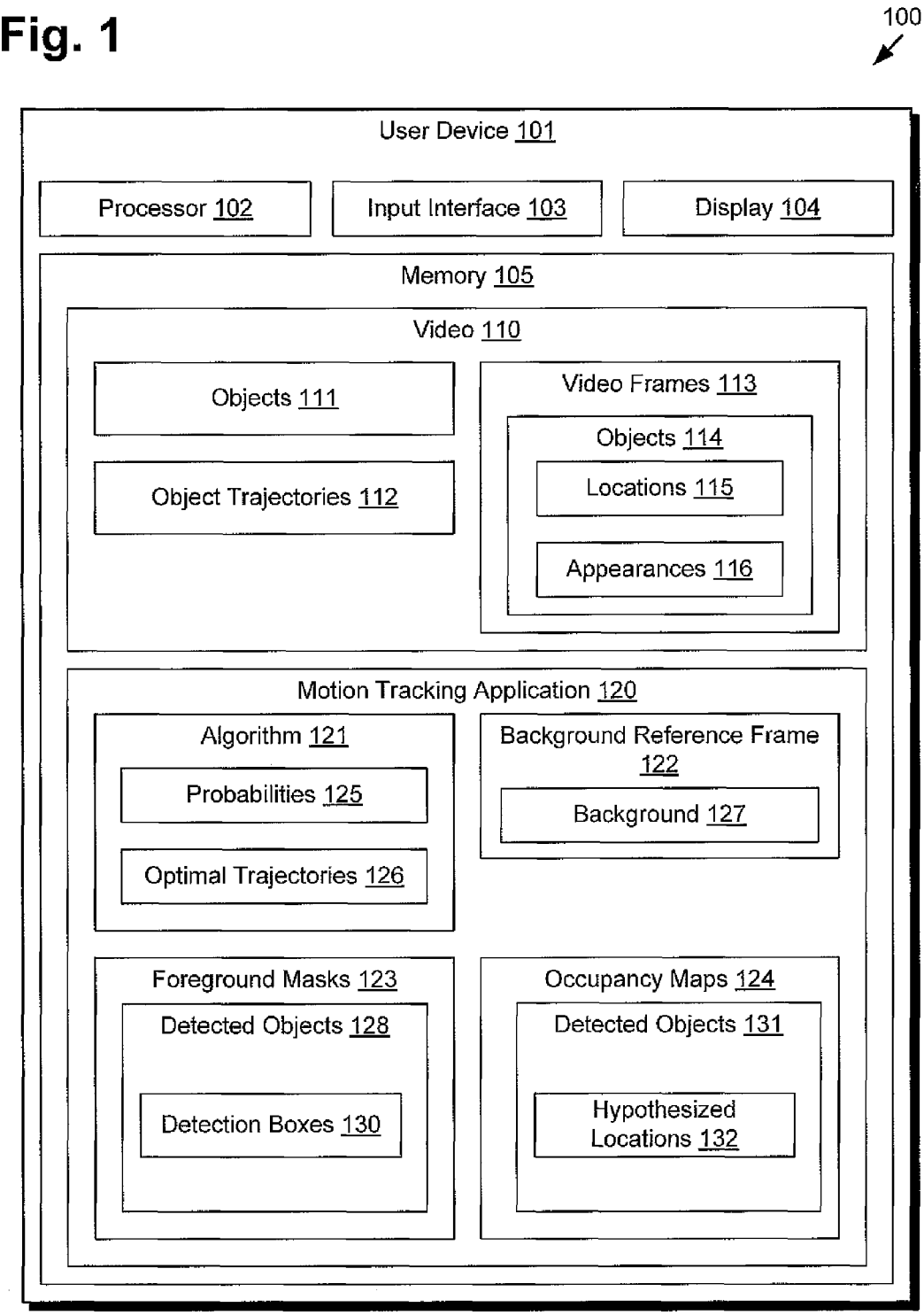
FIG. 1 presents a system for tracking objects in a video, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for tracking objects in a video, according to one implementation of the present disclosure. System 100 of FIG. 1 includes user device 101, which includes processor 102, user interface 103, display 104, and memory 105. Memory 105 includes video 110 and motion tracking application 120. Video 110 includes objects 111, object trajectories 112, and video frames 113. Video frames 113 include objects 114, which includes locations 115 and appearances 116. Motion tracking application 120 includes algorithm 121, background reference frame 122, foreground masks 123, and occupancy maps 124. Algorithm 121 includes probabilities 125 and optimal trajectories 126. Background reference frame 122 includes background 127. Foreground masks 123 includes detected objects 128, which includes hypothesized locations 129, and detection boxes 130. Occupancy maps 124 include detected objects 131, which includes hypothesized locations 132.

User device 101 may include a personal computer, a mobile phone, a tablet, a video game console, a toy, or any other device capable of executing motion tracking application 120 to track objects in a video. As shown in FIG. 1, user device 101 includes user interface 103 and display 104. Input interface 103 may comprise, for example, a keyboard, a mouse, a game controller, a touch-screen input, a thermal and/or electrical sensor, or any other device capable of accepting user input for use with user device 101. Display 104 may comprise a liquid crystal display (LCD) screen built into user device 101. In alternative implementations of the present disclosure, display 104 may be another type of display hardware, such as cathode-ray tubes (CRT) monitors. In yet other implementations, display 104 may also be touch sensitive and may serve as input interface 103. Moreover, user interface 103 and display 104 may be externally attached to user device 101 through physical or wireless connection.

As illustrated in FIG. 1, user device 101 further includes processor 102 and memory 105. Processor 102 may be configured to access memory 105 to store received input or to execute commands, processes, or programs stored in memory 105, such as motion tracking application 120. Processor 102 may correspond to a processing device, such as a microprocessor or similar hardware processing device, or a plurality of hardware devices. However, in other implementations processor 102 refers to a general processor capable of performing the functions required of user device 101. Memory 105 is a sufficient memory capable of storing commands, processes, and programs for execution by processor 102. Memory 105 may be instituted as ROM, RAM, flash memory, or any sufficient memory capable of storing a set of commands. In other implementations, memory 105 may correspond to a plurality memory types or modules.

Also illustrated in FIG. 1, memory 105 of user device 101 includes video 110. Video 110 may include a video of a sports match, a concert, a public location, or any other type of video that can be recorded and stored on user device 101. As such, video 110 may include a live or a previously recorded feed. Furthermore, in one implementation, video 110 may have been recorded using user device 101. For example, user device 101 may include a peripheral device (not shown), such as a video camera, that recorded video. In another implementation, video 101 may have been downloaded and stored on user device 101 from an outside source (not shown), such as a second user device.

Also illustrated in FIG. 1, video 110 includes objects 111, object trajectories 112, and video frames 113. Objects 111 may include, but are not limited to, one or more persons, animals, automobiles, trains, planes, or any other moving or stationary object in video 110. For example, objects 111 may include one or more sports players in a sporting match and one or more pedestrians that are watching the sporting match. Object trajectories 112 include the motion path of objects 111 throughout video 110. For example, and using the example above where objects 111 includes one or more sports players and one or more pedestrians at a sporting match, object trajectories 112 would include a motion path that each of the one or more sports players and each of the one or more pedestrians make during the course of video 110.

Video frames 113 include all of the frames that make up video 110. Video frames 113 include objects 114, which includes both locations 115 and appearances 116. Objects 114 of video frames 113 correspond to objects 111 of video 110, except that objects 114 only include the objects that are located in a single video frame from video frames 113. For example, if video 110 include four different objects 111 throughout its entire length that enter and leave during scenes, objects 114 may only include three of objects 111 that are present in a given video frame from video frames 113.

Locations 115 include the location of objects 114 in each of video frames 113. For example, if video 110 is a video of a baseball game, locations 115 may specify that a first player from objects 114 is located at first base during a first video frame from video frames 113, and locations 115 may specify that the first player from objects 114 is located at second base during a second video frame from video frames 113, where the second video frame takes place later in video 110. Appearances 116 include the appearance of objects 114 in each of video frames 113. For example, and using the example above where video 110 is a video of a baseball game, appearances 116 may specify that a first player from objects 114 is wearing a red shirt while a second player from objects 114 is wearing a blue shirt in one of video frames 113.

Also illustrated in FIG. 1, user device 101 includes motion tracking application 120. Motion tracking application 120 is used by user device 101 to track objects in videos, such as tracking objects 111 in video 110. Motion tracking application 120 tracks objects in a video by first detecting the number of objects and the spatial configuration of the objects in each video frame of the video, which are called detections, and then performing inter-frame correspondences of those detections over time to form trajectories of the objects. The inter-frame correspondences are called associations because they associate detections of objects between video frames, such as associating detections of objects between adjacent video frames of a video.

It should be noted that when discussing motion tracking application 120, the present disclosure discusses using video frames 113 from video 110 to track objects 111 in video 110. In one implementation, motion tracking application 120 may use every video frame from video frames 113 in order to track objects 111 in video 110. However, in other implementations, motion tracking application 120 only utilizes a set number of video frames from video frames 113 to track objects 111. For example, if video 110 is recorded at twenty-five frames per second, motion tracking application 120 may only use 5 frames for every second video 110 is recorded. In such an example, motion tracking application 120 will only utilize every fifth frame in order to track objects 111 in video 110. For another example, motion tracking application 120 may choose a frame sampling rate in order to choose which video frames from video frames 113 to utilize. In such an example, the frame sampling rate may be every half second so that only frames that occur at half-second intervals will be chosen from video frames 113 for use by motion tracking application 120.

Figure 2:
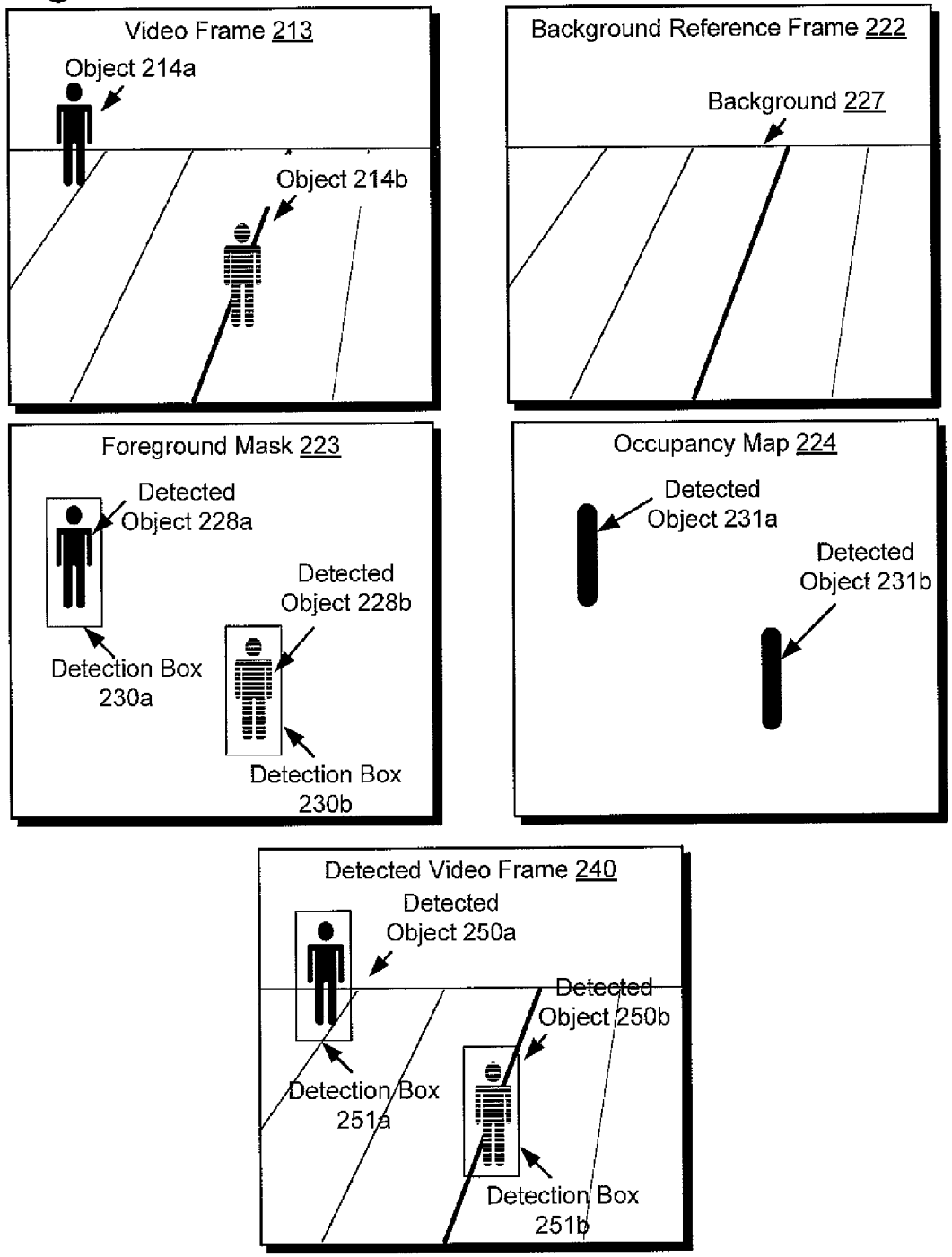
FIG. 2 presents an example of a method for detecting objects in a video frame, according to one implementation of the present disclosure.

As discussed above, to track objects in a video, motion tracking application 120 first detects objects in every video frame utilized from the video, such as detecting objects 114 from video frames 113 of video 110. In order to detect objects in video frames, in one implementation, motion tracking application 120 generates and utilizes each of background reference frame 122, foreground masks 123, and occupancy maps 124 to hypothesize the number and location of objects in each of the video frames. It should be noted that FIG. 2 illustrates how each of background reference frame 122, foreground masks 123, and occupancy maps 124 are generated and utilized by motion tracking application 120 to hypothesize object locations in video frames, which will be discussed below. Background reference frame 122 corresponds to a video fame that only includes the background of the video, such as background 127. For example, a background reference frame for video 110 would include a single frame of the background of video 110, where none of objects 111 are present. Background reference frame 122 is thus generated by motion tracking application 120 as the first step to detecting objects in video frames, such as video frames 113.

Foreground masks 123 correspond to the video frames utilized to track objects in a video, except foreground masks 123 only include the objects from the video frames, such as detected objects 128. For example, if motion tracking application 120 is using video frames 113 to track objects 111 of video 110, foreground masks 123 would correspond to video frames 113, except that foreground masks 123 would only include objects 114 from video frames 113 and not the background of video frames 113. In such an example, detected objects in 128 in foreground masks 123 would correspond to objects 114 in video frames 113. Motion tracking application 120 can thus use foreground masks 123 for object detection in video frames 113.

As illustrated in FIG. 1, detected objects 128 include hypothesized locations 129 and detection boxes 130. As discussed above, motion tracking application 120 can use foreground masks 123 to detect objects in video frames, such as detected objects 128. As such, hypothesized locations 129 include a location for each of detected objects 128 within the foreground masks 123. For example, hypothesized locations 129 of foreground masks 123 may correspond to a hypothesis of where locations 115 for objects 114 in video frames 113 are located. Detection boxes 130 includes a marker placed on each of detected objects 128 in foreground masks 123 that indicates that an object is present at hypothesized locations 129, as will be illustrated in FIG. 2.

Occupancy maps 124 are similar to foreground masks 123 except that occupancy maps 124 give a location of objects in video frames according to ground locations. For example, foreground masks 123 are used by motion tracking application 120 to indicate the presence of objects at different locations in an image plane of a video, where the image plane is dependent on the position, orientation and projective aspects of the camera that shoots the video, while occupancy maps 124 are used by motion tracking application 120 to indicate the presence of objects at different locations in the ground plane of the video. As illustrated in FIG. 1, occupancy maps 124 include detected objects 131, which include hypothesized locations 132. Hypothesized locations 132 include the hypothesized ground locations of objects within occupancy map 124. As such, hypothesized locations 132 of detected objects 131 from occupancy map 124 directly correspond to detection boxes 130 of detected objects 128 from foreground mask 123, as hypothesized locations 132 are used to determine where detected objects 128 are located in foreground mask 123 and, as discussed above, detection boxes 130 are placed on detected objects 128 to show the locations of detected objects 128 in foreground mask 123.

Also illustrated in FIG. 1, motion tracking application 120 includes algorithm 121. As discussed above, after motion tracking application 120 detects objects and the configuration of the objects in each video frame of a video, motion tracking application 120 then performs inter-frame correspondences of those detections over time to form trajectories for the objects. As such, motion tracking application 120 uses algorithm 121 to determine the inter-frame correspondences of detections over time to form the trajectories for the objects, such as using algorithm 121 to determine object trajectories 112 for objects 111 of video 110.

Algorithm 121 includes probabilities 125 and optimal trajectories 126. Probabilities 125 may include a cost matrix that associates detected objects between video frames. To associate detected objects between video frames, probabilities 125 includes probabilities that a first detected object from each of the detected objects in a frame is the same as another detected in an adjacent video frame. Probabilities 125 includes these probabilities for every detected object in the video frames used to track trajectories of objects in a video, such as all of the detected objects in video frames 113 of video 110.

For example, suppose that three objects were detected in a first video frame, which are people named Aaron, Kirk, and Evan. Also suppose that in a second video frame, which is adjacent to the first video frame, another three objects were detected. Probabilities 125 would include probabilities that each of the three people detected in the first video frame is the same as one of the three objects detected in the second video frame. For example, the probability that Aaron from the first video frame corresponds a first of the three objects detected in the second video frame, the probability that Kirk from the first video frame corresponds to a second of the objects detected in the second video frame, and the probability that Evan from the first video frame corresponds to a third of the objects detected in the second video frame. Probabilities 125 would include these probabilities for all detected objects in all of the video frames used to track the trajectories of detected objects in a video.

It should be noted that the example above only discusses finding probabilities that Aaron, Kirk, and Evan from a first video frame correspond to three detected objects from a second video frame, however, one or more of Aaron, Kirk, or Evan may not correspond to one of the three detected objects in the second video frame. For example, Aaron from the first video frame may not be present in the second video frame. In such an example, a new person may be included as one of the three detected objects in the second video frame and Aaron would thus not have a corresponding match in the second video frame. For another example, there may be four detected objects in the second video frame, where a new person is now detected. In such an example, motion tracking application 120 would then have to determine probabilities that each of Aaron, Kirk, and Evan from the first video frame correspond to one of the four detected objects in the second video frame.

It should be noted that when determining associations between adjacent video frames, motion tracking application 120 may consider various factors. For example, in one implementation, motion tracking application 120 may factor in the appearance of detected objects between adjacent video frames when determining associations of detected objects. In such an example, if adjacent video frames each had one detected object wearing a red shirt and a second detected object wearing a blue shirt, then motion tracking application 120 may associate the two detected objects wearing the red shirt together and the two detected objects wearing the blue shirt together between the adjacent frames. For a second example, in another implementation, motion tracking application 120 may factor in a distance between detected objects in adjacent frames when determining associations of detected objects. In such example, a detected object in a first video frame may only be associated with a detected object in an adjacent video frame if a change in distance of the locations between the detected objects in the adjacent frames is not greater than a threshold amount. The threshold amount in such an example may be determined by how far a detected object can travel based on a time difference between the adjacent video frames. Furthermore, in a third example, in one implementation, motion tracking application 120 may factor in both appearance of detected objects and distance between detected objects in adjacent frames to determine associations between detected objects.

After generating probabilities 125, algorithm 121 computes optimal trajectories 126 for the detected objects in the video frames using probabilities 125. Optimal trajectories 126 include the computed trajectory for each of the detected objects. Algorithm 121 may compute optimal trajectories 126 using either a maximum flow algorithm or a Munkres-Kuhn (Hungarian) algorithm based on probabilities 125.

It should be noted that after motion tracking application 120 computes and extracts hypothesized object locations and optimal trajectories of the objects in a video, motion tracking application 120 may then either accept or reject the hypothesized object locations and the optimal trajectories based on occupancy maps 124. As such, motion tracking application 120 computes the product of all hypothesized object location probabilities from occupancy maps 124 and looks for object trajectories that are probable. Object trajectories that are probable are accepted while object trajectories that are not probable are rejected. For example, and using video 110, after motion tracking application 120 computes and extracts hypothesized locations 132 of detected objects 128/131 and optimal trajectories 126 of detected objects 128/131, motion tracking application 120 can either accept or reject hypothesized locations 132 and optimal trajectories 126 based on occupancy maps 124.

It should further be noted that motion tracking application 120 may further use an appearance of detected objects to accept or reject hypothesized locations and optimal trajectories of objects. Motion tracking application 120 does this by looking for appearance consistencies of detected objects, such as the color of detected objects, during the duration of the optimal trajectories. If the appearances of detected objects are consistent throughout the duration of optimal trajectories, motion tracking application 120 will accept the optimal trajectories. However, if the appearances of detected objects are not consistent throughout the duration of the optimal trajectories, motion tracking application 120 will reject the optimal trajectories. For example, optimal trajectories 126 may illustrate that a detected object includes a blue shirt for the first half of its trajectory and a red shirt for the second half of its trajectory. Motion tracking application 120 can then reject optimal trajectories 126 since the color of the shirt of the detected object illustrates that the trajectory must belong to two different objects, a first object with a blue shirt and a second object with a red shirt.

It should further be noted that motion tracking application 120 may repeat the above computation of determining hypothesized object detections and trajectories using an iterative process that proposes new possible sets of object detections using a stochastic sampler. In each iteration, motion tracking application 120 may choose one or more video frames either uniformly or randomly to add a detected object or remove one of the detected objects. Motion tracking application 120 may further choose one or more video frames uniformly or randomly and move the hypothesized location of one or more detections to a new hypothesized location. By iteratively proposing new sets of hypothesized object detections, motion tracking application 120 can compute new optimal trajectories and compare each result to find the best result for the given video.

For example, after computing optimal trajectories 126 for video 110 using hypothesized locations 132, motion tracking application 120 may generate new hypothesized object detections by either adding or removing one of detected objects 128/131 from a video frame of video frames 113, or alter one or more hypothesized locations 132 of detected objects 128/131 in one or more of video frames 113. Motion tracking application 120 may then use algorithm 121 to compute a second set of optimal trajectories 126 using the new hypothesized object locations. After iteratively repeating this process many times, motion tracking application 120 can choose a best result as compared to video 110.

It should be noted that the implementation of FIG. 1 only discusses using motion tracking application 120 to track detected objects in video frames of a video, however, the present disclosure is not limited to using motion tracking application 120 to only track detected objects in a video. In other implementations, motion tracking application 120 may be utilized to track detected objects in any type of data that is recorded over time. In such implementations, the recorded data may be obtained at predetermined time intervals to generate sensory data frames. The sensory data frames of the recorded data would thus correspond to the video frames of a video, as discussed above. Motion tracking application 120 would then determine locations for the detected objects in the sensory data frames. Finally, motion tracking application 120 would determine trajectories for the detected objects throughout the recorded data using the sensory data frames in a similar way as motion tracking application 120 determined the trajectories of the detected objects in the video using the video frames. The sensory data may be generated by one or more sensors, such as a video camera, a laser device, etc.

For example, in one implementation, motion tracking application 120 may be utilized to track detected objects from laser range data that is recorded over a period of time and stored in a cloud. In such an implementation, the laser range data is obtained predetermined intervals to generate sensory data frames of the laser range data. Motion tracking application 120 would then detect objects in the sensory data frames by looking for known shapes, such as circles that would indicate the head of a person. After detecting objects in the sensory data frames, motion tracking application 120 would determine trajectories for the detected objects in the sensory data frames in a similar way as motion tracking application 120 determined optimal trajectories 126 for the detected objects in the video frames.

FIG. 2 presents an example of a method for detecting objects in a video frame, according to one implementation of the present disclosure. FIG. 2 includes video frame 213, background reference frame 222, foreground mask 223, occupancy mask 224, and detected video frame 240. Video frame 221 includes object 214a and object 214b, collectively referred to as objects 214. Background reference frame 222 includes background 227. Foreground mask 223 includes detected object 228a and detected object 228b, collectively referred to as detected objects 228, and detection box 230a and detection box 230b, collectively referred to as detection boxes 230. Occupancy map 224 includes detected object 231a and detected object 231b, collectively referred to as detected objects 231. Detected video frame 240 includes detected object 250a and detected object 250b, collectively referred to as detected objects 250, and detection box 251a and detection box 251b, collectively referred to as detection boxes 251.

With regards to FIG. 2, it should be noted that video frame 213, background reference frame 222, foreground mask, 223, and occupancy map 224 correspond respectively to one of video frames 111, background reference frame 122, one or foreground masks 123, and one of occupancy maps 124 of FIG. 1. It should further be noted that objects 214, background 227, detected objects 228, detection boxes 230, and detected objects 231, of FIG. 2 correspond respectively to objects 114, background 127, detected objects 128, detection boxes 130, and detected objects 231 of FIG. 1. Finally, it should be noted that locations 115, hypothesized location 129, and hypothesized location 132 have not been labeled in FIG. 2 for clarity purposes.

As discussed above in FIG. 1, to track objects in a video, a motion tracking application first detects objects in every video frame utilized from the video. For example, a motion tracking application may try to detect objects 214 from video frame 213, where video frame 213 corresponds to a single video frame from a video that the motion tracking application is using to detect objects. The motion tracking application both generates and utilizes each of background reference frame 222, foreground mask 223, and occupancy map 224 to detect objects 214 from video frame 213.

The motion tracking application first generates background reference frame 222 using the video that video frame 213 corresponds to, such as motion tracking application 120 generating background reference frame 122 using video 110 from FIG. 1. In order to generate background reference frame 222, the motion tracking application takes the median pixel value of every pixel in the entire video, which gives an image as a reference. The reference image that is generated by the motion tracking application corresponds to background reference frame 222, where only background 227 is left in background reference frame 222 without any objects.

Next, after generating a background reference frame, the motion tracking application utilizes the background reference frame to generate a foreground mask for every video frame that is being used to track objects in the video by subtracting the background reference frame from every video frame. For example, and using FIG. 1, motion tracking application 120 would generate one foreground mask from foreground masks 123 for each video frame from video frames 113 used to track objects 111 in video 110. Motion tracking application would generate foreground masks 123 by subtracting background reference frame 122 from each of video frames 113, which takes background 127 out of each of video frames 113. As illustrated in FIG. 2, background reference frame 222 includes background 227, which is the same as the background in video frame 213. By subtracting background reference frame 222 from video frame 213, only objects 214 from video frame 213 would remain, as illustrated by foreground mask 223 only including detected objects 228. Detected objects 228 of foreground mask 223 thus correspond to hypothesized detections for objects 214 of video frame 213.

After the motion tracking application generates foreground masks, the motion tracking application then uses the foreground masks to generate occupancy maps. As discussed above, occupancy maps are similar to foreground masks except that occupancy maps give a location of objects in video frames according to ground locations while foreground masks give a location of objects in the video frames according to an image plane. For example, and as illustrated in FIG. 2, occupancy map includes detected objects 231 and hypothesized locations 232, which correspond respectively to detected objects 228 and detection boxes 230.

It should be noted that detected objects 231 are illustrated in occupancy map 224 as locations on the ground plane, while foreground mask 223 illustrated detected objects 228 as projected bounding boxes of cylinders with estimated heights. This is because when creating occupancy map 224, there is a certain amount of uncertainty caused along the line of sight of the camera. It is because of this uncertainty, occupancy map 224 gives a good idea of where detected objects 231 are laterally, but there is a little uncertainty of where detected objects are located in the ground plane along the line of sight. A peak of each of the cylinders of detected objects 231 gives the motion tracking application an idea that an object is present in occupancy map 224. The motion tracking application can then hypothesizes that the cylinder is a location of an object.

It should be noted that the implementation of FIG. 2 only illustrates background subtraction to generate occupancy map 224 using background reference frame 222 and foreground mask 223, however, the present disclosure is not limited to using only background subtraction to generate occupancy map 224. For example, in one implementation, a motion tracking algorithm may generate an occupancy map by convolving each video frame with an appearance template to compute a probability image of object detections. In such an implementation, similarities would be computed between each video frame and the appearance template.

After the motion tracking application has generated each of background reference frame 222, foreground mask 223, and occupancy map 224, the motion tracking application then uses occupancy map 224 to hypothesize the location of objects 214 in video frame 213. As illustrated in FIG. 2, detected video frame 240 includes detected objects 250. Detected video frame 240 thus corresponds to video frame 213 except detected video frame 240 includes hypothesized locations for objects 214 in video frame 213 as detected objects 250. The hypothesized location for each of detected objects 250 is illustrated by detection boxes 251.

Figure 3:
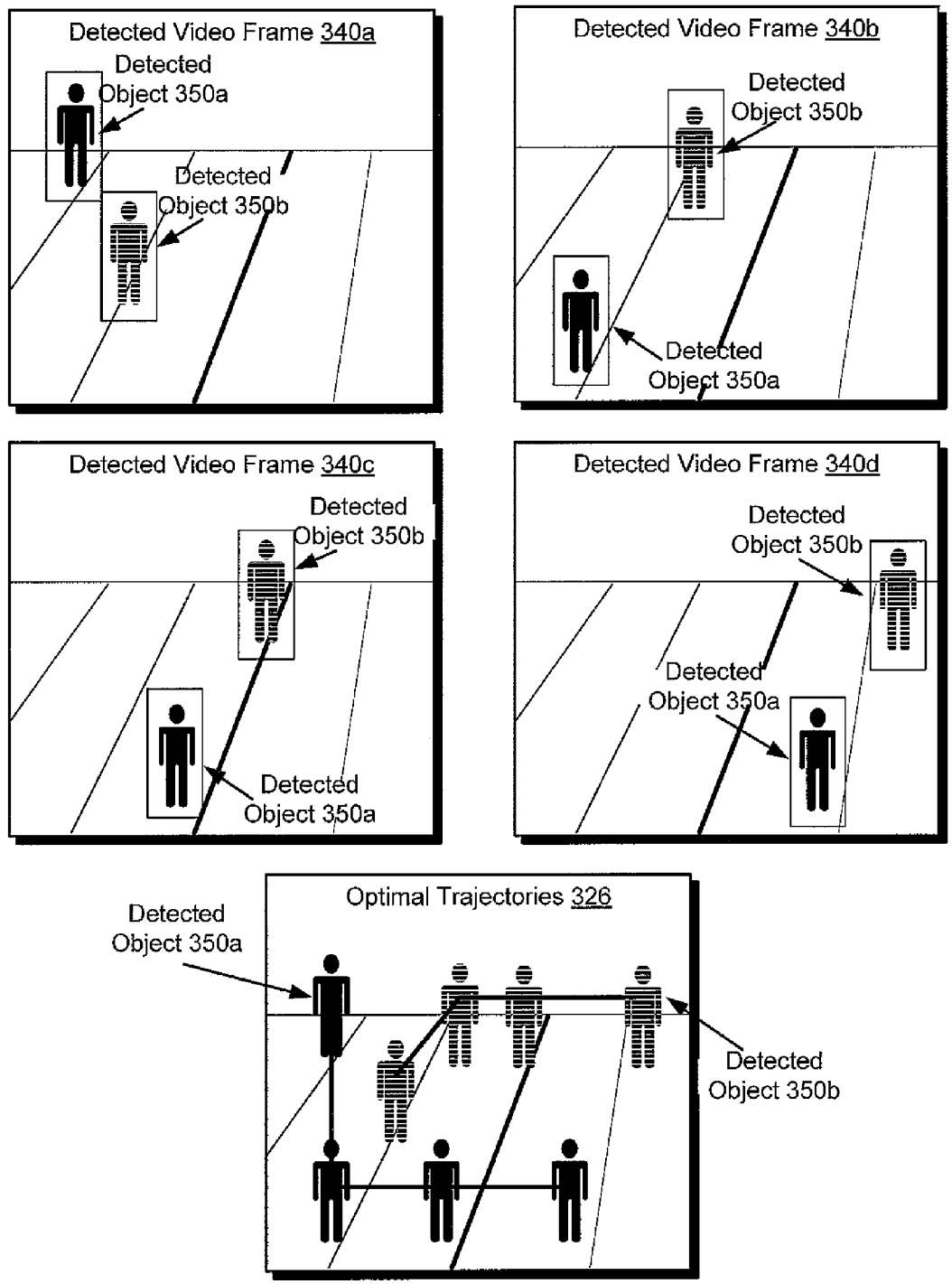
FIG. 3 presents an example of using detected objects in a video frame to compute optimal trajectories, according to one implementation of the present disclosure.

FIG. 3 presents an example of using detected objects in a video frame to compute optimal trajectories, according to one implementation of the present disclosure. FIG. 3 includes detected video frame 340a, detected video frame 340b, detected video frame 340c, and detected video frame 340d, collectively referred to as detected video frames 340, and optimal trajectories 326. Detected video frames 340 and optimal trajectories 326 include detected object 350a and detected object 350b, collectively referred to as detected objects 350. It should be noted that with regards to FIG. 3, optimal trajectories 326 corresponds with optimal trajectories 126 of FIG. 1. It should further be noted that detected video frames 340 correspond with detected video frame 240 of FIG. 2, where a background reference frame, foreground masks, and occupancy maps have been used to determine hypothesized object locations for detected objects 350 in detected video frames 340. Furthermore detected objects 350 are illustrated with detection boxes (not labeled) in video frames 350 to show their hypothesized object location.

As illustrated in FIG. 3, each of detected video frames 350 includes detected object 350a and detected object 350b. Detected video frames 350 may correspond to four different video frames from a video, such as four video frames from video frames 113 of video 110 from FIG. 1, where hypothesized locations for objects 114 of video frames 113 have been determined. As shown in detected video frames 340, detected object 350a and detected object 350b are changing location throughout the video. For example, detected object 350a starts in at the upper left corner of detected video frame 340a, moves to a lower left corner in detected video frame 340b, then moves to the right in detected video frame 340c and detected video frame 340d. For another example, detected object 350b starts in a middle left position in detected video frame 340a, moves to an upper middle position in detected video frame 340b, and then moves to the right in detected video frame 340c and detected video frame 340d.

As further illustrated in FIG. 3, optimal trajectories 326 includes detected object 328a and detected object 328b, however, optimal trajectories 326 illustrates the complete trajectory of detected object 350a and the complete trajectory of detected object 350b from detected video frames 340. For example, and using the example above with regards to FIG. 1, motion tracking application 120 may have used background reference frame 122, foreground masks 123, and occupancy maps 124 to find detections in video frames 113 of video 110, where the detections correspond to two objects from objects 114. Motion tracking application 120 may have then used the detections from video frames 113 and computed optimal trajectories 126 using algorithm 121.

Figure 4:
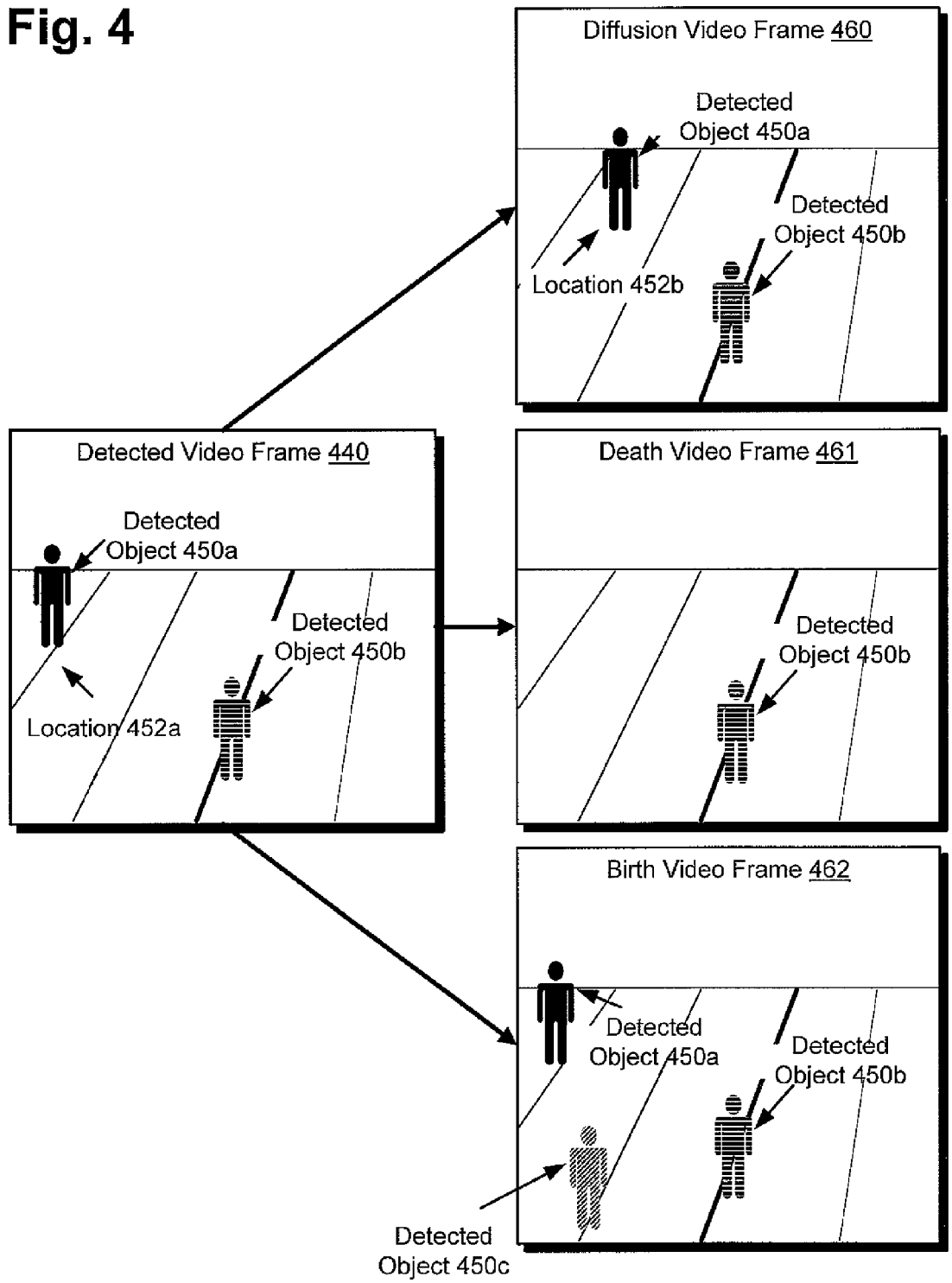
FIG. 4 presents a method of using a stochastic sample to hypothesize locations of detected objects in a video frame, according to one implementation of the present disclosure.

FIG. 4 presents a method of using a stochastic sampler to hypothesize locations of detected objects in a video frame, according to one implementation of the present disclosure. FIG. 4 includes detected video frame 440, diffusion video frame 460, death video frame 461, and birth video frame 462. Detected video frame 440 includes detected object 450a, detected object 450b, and location 452a. Diffusion video frame 460 include detected object 450a, detected object 450b, and location 452b. Death video frame 461 includes detected object 450b. Birth video frame 462 includes detected object 450a, detected object 450b, and detected object 414c. In reference to FIG. 4, it should be noted that detected video frame 440 corresponds to detected video frame 240 from FIG. 2, where a motion tracking algorithm has determined hypothesized object locations for detected objects 450a and 450b.

As discussed above, a motion tracking application iteratively proposes new sets of hypothesized object detections and trajectories for those hypothesized object detections. For example, detected video frame 440 illustrates hypothesized object detections for detected object 450a and detected object 450b. A motion tracking application may have used the hypothesized object detections from detected video frame 440, and all other video frames from the same video, to compute optimal trajectories for detected object 450a and detected object 450b. The motion tracking application may then iteratively propose new sets of hypothesized object detections based on the hypothesized object detections from detected video frame 440.

Diffusion video frame 460 shows an example of changing the location of one of the detected objects in a video frame. As illustrated in diffusion video frame 460, location 452a of detected object 450a in detected video frame 440 has moved slightly to the right in diffusion video frame 460 to location 452b. When moving a location of a detected object in a video frame, the location of the detected object may be moved in just one video frame or more than one of the video frames. Furthermore, a location of more than one of the detected objects may be moved in one or more of the video frames.

Death video frame 461 illustrates removing a detected object from one of the video frames. As illustrated in death video frame 461, detected object 450a has been removed from death video frame 461 as compared to detected video frame 440. When removing a detected object from a video frame, the detected object may be removed from just one of the video frames or more than one of the video frames. Furthermore, more than one detected object may be removed from one or more of the video frames.

Birth video frame 462 illustrates adding a detected object to one of the video frames. As illustrated in birth video frame 462, detected object 450c has been added to birth video frame 462 as compared to detected video frame 440. When adding a detected object to a video frame, the detected object may be added to just one of the video frames or more than one of the video frames. Furthermore, more than one detected object may be added to one or more of the video frames.

In each of diffusion video frame 460, death video frame 461, and birth video frame 462, the hypothesized object locations from detected video frame 440 changed just a little bit. The motion tracking application can then compute new optimal trajectories for the detected objects using the new hypothesized object locations. The motion tracking application can keep repeating the steps of adding, removing, or moving detected objects and computing optimal trajectories until the motion tracking application finds a best possible solution for the trajectories of the objects in the video that the motion tracking application is trying to track.

FIG. 5 shows a flowchart illustrating a method for hybrid stochastic/deterministic optimization for tracking sports players and pedestrians in video, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 1, the disclosed inventive concepts are not intended to be limited by specific features shown and described with respect to FIG. 1. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes determining a first hypothesized location of each of the objects in each of the plurality of frames (510). For example, processor 102 of user device 101 may execute motion tracking application 120 to hypothesize locations 115 of objects 114 in each of video frames 113. As discussed above, motion tracking application 120 may hypothesize locations 115 by generating background reference frame 122, foreground mask 123, and occupancy map 124. The hypothesized location may be determined using occupancy maps 124, and then going back to video frames 113 to mark bounding boxes 130 of where detected objects 128/131 are located in video frames 113.

Flowchart 500 also includes, for each of the plurality of frames, determining probabilities that the first hypothesized location of each of the objects in a frame of the plurality of frames is the same as the first hypothesized location of another object in an adjacent frame (520). For example, processor 102 of user device 101 may execute algorithm 121 of motion tracking application 120 to generate probabilities 125. As discussed above, probabilities 125 may include a cost matrix that includes, for each of video frames 113, probabilities that a detected object in a first frame of video frames 113 is the same as another detected object in an adjacent frame of video frames 113. Probabilities 125 would include these probabilities for every detected object in every pair of adjacent video frames of the video.

Flowchart 500 also includes computing a first optimal trajectory of each of the objects using an algorithm based on the probabilities (530). For example, processor 102 of user device 101 may execute motion tracking application 120 to compute optimal trajectories 126 for each of objects 111 using algorithm 121 based on probabilities 125. As discussed above, algorithm 121 may use either a Network Flow Graph or a Hungarian Cost Matrix to compute optimal trajectories 126 based on the probabilities included in probabilities 125.

Flowchart 500 also includes checking the first optimal trajectory for each of the objects (540). For example, processor 102 of user device 101 may execute motion tracking application 120 to check optimal trajectories 126. As discussed above, motion tracking application 120 may check optimal trajectories 126 using occupancy maps 124, and may check optimal trajectories 126 using appearances of detected objects 128/131 throughout the entire duration of optimal trajectories 126. For example, motion tracking application 120 may compute the product of all hypothesized object location probabilities in occupancy maps 124 and check for object trajectories that are probable using the hypothesized object location probabilities. For another example, motion tracking application 120 may check appearances of detected objects 128/131 throughout the duration of optimal trajectories 126, such as the color of detected objects 128/131, to find consistencies with the appearances of detected objects 128/131.

Flowchart 500 also includes accepting or rejected the hypothesized location and the optimal trajectory for each of the objects based on the checking (550). For example, processor 102 of user device 101 can accept the hypothesized object locations and optimal trajectories 126 based on the checking of the hypothesized object locations and optimal trajectories 126. Motion tracking application 120 will accept the hypothesized object locations and optimal trajectories 126 if they make up the best possible solution for video 110, or reject the hypothesized object locations and optimal trajectories 126 if they do not make up the best possible solution for video 110.

Optionally, flowchart 500 also includes iteratively repeating the method using new hypothesized locations for the objects until a best solution is computed (560). For example, processor 102 of user device 101 may execute motion tracking application 120 to determine new hypothesized locations for objects 114 in video frames 113 and compute new optimal trajectories based on the new hypothesized locations. As discussed above, motion tracking application 120 can determine new hypothesized locations by using a stochastic sampler which either adds or removes one or more detected objects from one or more video frames, or moves a location of one or more detected objects in one or more video frames. Motion tracking application 120 will repeat this process until the best possible solution for hypothesized location and optimal trajectories 126 of objects 111 in video 110 are computed. The best possible solution corresponds to the solution that most closely matches object trajectories 112 of video 110.

It should be noted that the method of flowchart 500 only discusses using motion tracking application 120 to track detected objects in a video using video frames, however, as discussed above with reference to FIG. 1, the present disclosure is not limited to only using motion tracking application 120 to track detected objects in video. In other implementations, motion tracking application 120 may be utilized to track detected objects in any data that is recorded over time. In such implementations, the recorded data may be obtained at predetermined time intervals to generate sensory data frames, where the sensory data frames would correspond to the video frames from the video. Motion tracking application 120 would determine trajectories for the detected objects throughout the recorded data using the sensory data frames in a similar way as motion tracking application 120 determined the trajectories of the detected objects in the video using the video frames.

For example, and as discussed above, in one implementation, motion tracking application 120 may be utilized to track detected objects from laser range data that is recorded over a period of time and stored in a cloud. In such an implementation, the laser range data is obtained at predetermined intervals to generate sensory data frames of the laser range data. Motion tracking application 120 would then detect objects in the sensory data frames by looking for known shapes, such as circles that would indicate the head of a person. After detecting objects in the sensory data frames, motion tracking application 120 would determine trajectories for the detected objects in the sensory data frames using a similar method as motion tracking application 120 determined optimal trajectories 126 for the detected objects in the video frames, as described in flowchart 500.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a memory for storing a plurality of video frames; and
a processor configured to track objects in the plurality of video frames by:
determining a first hypothesized location for each of the objects in each of the plurality of video frames by:
performing a background subtraction on the video to obtain a background reference frame:
comparing each of the plurality of video frames to the background reference frame to obtain a foreground mask for each of the plurality of video frames; and
generating an occupancy map for each of the plurality of video frames using the foreground mask for each of the plurality of video frames;
for each of the plurality of video frames, determining probabilities that the first hypothesized location of each of the objects in a video frame of the plurality of video frames is the same as the first hypothesized location of another object in an adjacent video frame;
computing a first optimal trajectory for each of the objects using an algorithm based on the probabilities;
checking the first optimal trajectory for each of the objects; and
accepting or rejecting the first optimal trajectory for each of the objects based on the checking.

2. The system of claim 1, wherein the processor is further configured to:
determine a second hypothesized location for each of objects in each of the plurality of video frames;
for each of the plurality of video frames, determine second probabilities using the second hypothesized location for each of the objects;
compute a second optimal trajectory for each of the objects using the algorithm based on the second probabilities;
check the second optimal trajectory for each of objects; and
accept or reject the second optimal trajectory for each of the objects based on the checking.

3. The system of claim 2, wherein determining the second hypothesized location for each of the objects includes at least one of changing the first hypothesized location of at least one of the objects to get the second hypothesized location of the at least one of the objects in the plurality of video frames, adding an object to the objects, or removing an object from the objects.

4. The system of claim 1, wherein the checking the first optimal trajectory for each of the objects includes at least one of checking if the first optimal trajectory is probable using occupancy maps and checking appearances of each of the objects during a duration of the first optimal trajectory.

5. The system of claim 1, wherein the first hypothesized location for each of the objects corresponds to a peak in the occupancy map for each of the plurality of video frames.

6. The system of claim 1, wherein the algorithm includes at least one of a maximum flow algorithm or a Munkres-Kuhn (Hungarian) algorithm.

7. The system of claim 1, wherein each of the objects includes a person.

8. The system of claim 1, wherein the processor is further configured to:
locate each of the objects in the plurality of video frames using the first hypothesized location of each of the objects; and
mark each of the objects in the plurality of video frames using a detection box.

9. A method comprising:
obtaining a plurality of video frames; and
tracking objects in the plurality of video frames by:
determining a first hypothesized location for each of the objects in each of the plurality of video frames by:
performing a background subtraction on the video to obtain a background reference frame:
comparing each of the plurality of video frames to the background reference frame to obtain a foreground mask for each of the plurality of video frames; and
generating an occupancy map for each of the plurality of video frames using the foreground mask for each of the plurality of video frames;
for each of the plurality of video frames, determining probabilities that the first hypothesized location of each of the objects in a video frame of the plurality of video frames is the same as the first hypothesized location of another object in an adjacent video frame;
computing a first optimal trajectory for each of the objects using an algorithm based on the probabilities;
checking the first optimal trajectory for each of the objects; and
accepting or rejecting the first optimal trajectory for each of the objects based on the checking.

10. The method of claim 9, further comprising:
determining a second hypothesized location for each of objects in each of the plurality of video frame;
for each of the plurality of data sensory frames, determining second probabilities using the second hypothesized location for each of the objects;
computing a second optimal trajectory for each of the objects using the algorithm based on the second probabilities;
checking the second optimal trajectory for each of objects; and
accepting or rejected the second optimal trajectory for each of the objects based on the checking.

11. The method of claim 10, wherein determining the second hypothesized location for each of the objects includes at least one of changing the first hypothesized location of at least one of the objects to get the second hypothesized location of the at least one of the objects in the plurality of video frames, adding an object to the objects, or removing an object from the objects.

12. The method of claim 9, wherein checking the first optimal trajectory for each of the objects includes at least one of checking if the first optimal trajectory is probable using occupancy maps and checking appearances of each of the objects during a duration of the first optimal trajectory.

13. The method of claim 9, wherein the first hypothesized location for each of the objects corresponds to a peak in the occupancy map for each of the plurality of video frames.

14. The method of claim 9, wherein the algorithm includes at least one of a maximum flow algorithm or a Munkres-Kuhn (Hungarian) algorithm.

15. The method of claim 9, wherein each of the objects includes a person.

16. The method of claim 9, further comprising:
- locating the objects in each of the plurality of video frames using the first hypothesized location for each of the objects; and
- marking each of the objects in the plurality of video frames using a detection box.

* * * * *